United States Patent [19]

Wimbush

[11] Patent Number: 4,810,041
[45] Date of Patent: Mar. 7, 1989

[54] INERTIA VALVES

[75] Inventor: Maurice J. Wimbush, Whitnash, Leamington Spa, England

[73] Assignee: Automotive Products PLC, Leamington Spa, England

[21] Appl. No.: 154,519

[22] Filed: Feb. 5, 1988

Related U.S. Application Data

[63] Continuation of Ser. No. 930,255, Nov. 13, 1986, abandoned.

[30] Foreign Application Priority Data

Nov. 13, 1985 [GB] United Kingdom ............. 8527972

[51] Int. Cl.$^4$ .................... B60T 8/00; B21D 53/00
[52] U.S. Cl. .................... 303/24.1; 303/9.75; 29/157.1 R
[58] Field of Search .......... 303/6 C, 24 A, 24 C, 303/24 F, 24 R, 24 B, 56, 9.62, 9.67, 9.68, 9.75, 24.1; 188/34 J; 137/285, 15, 38, 315; 251/359, 365; 29/157.1 R

[56] References Cited

U.S. PATENT DOCUMENTS

| | | | |
|---|---|---|---|
| 3,787,096 | 1/1974 | Shellhause | 303/24 F |
| 3,922,020 | 11/1975 | Koike et al. | 303/6 C |
| 4,072,363 | 2/1978 | Tomoyuki | 303/24 C |
| 4,181,370 | 1/1980 | Noeami et al. | 303/24 C |
| 4,203,630 | 5/1980 | Dixon | 303/24 C |
| 4,273,386 | 6/1981 | Farr | 303/24 F X |
| 4,319,786 | 3/1982 | Nogami | 303/24 A |
| 4,630,870 | 12/1986 | Kaub | 303/24 F |

FOREIGN PATENT DOCUMENTS

| | | |
|---|---|---|
| 0180360 | 10/1983 | Japan .................. 303/24 C |
| 1321921 | 7/1973 | United Kingdom . |
| 1351401 | 5/1974 | United Kingdom . |
| 1488353 | 10/1977 | United Kingdom . |
| 2021221A | 11/1979 | United Kingdom . |

Primary Examiner—Andres Kashnikow
Assistant Examiner—Timothy Newholm
Attorney, Agent, or Firm—Solon B. Kemon; Shlesinger, Arkwright & Garvey

[57] ABSTRACT

An inertia valve includes a valve member which is free to move axially in a cylindrical housing between a baffle plate and a valve seat. The baffle plate is provided with at least one collapsible formation which may be partially crushed against an adjacent wall of the housing to provide approximate location of the baffle plate relative to the valve seat and an adjustable screw demise for accurately adjusting free movement of the valve member after assembly of the valve.

1 Claim, 1 Drawing Sheet 4,810,041

INERTIA VALVES

BACKGROUND TO THE INVENTION

The present invention relates to inertia valves.

In one form of inertia valve, the ball or valve member is arranged to move against a biassing force and into engagement with a valve seat, under the influence of an inertial load. In order to accurately calibrate such valves, it is necessary to adjust the separation between the valve member and valve seat, so that manufacturing tolerances in the components of the valve can be accommodated.

SUMMARY OF THE INVENTION

According to one aspect of this invention, an inertia valve comprises; a housing having an inlet and outlet with a passage therebetween, said passage including a cylindrical chamber; a valve member located within said chamber and free to move from one end thereof to the other; a valve seat disposed between the inlet and outlet at one end of the chamber, said seat being separated axially from the valve member when the valve member abuts the other end of the chamber and being closed by the valve member when the valve member abuts the seat; and an adjustable baffle plate against which the valve member will abut when at said other end of the chamber, said baffle plate having at least one collapsible formation which will abut the adjacent end wall of the housing and adjustable screw means which forms an abutment for said valve member.

In operation the valve member will be biassed away from the seat and will move into engagement with the seat under a predetermined inertial load. This may be achieved by installing the valve so that the axis of the chamber is inclined to the horizontal and the valve member will be biassed way from the seat under the influence of gravity. Alternatively, spring means may apply the necessary biassing to the valve member.

According to a further aspect of the present invention a method of assembling an inertia valve according to said one aspect of the invention includes; pressing the baffle plate into one end of the cylindrical chamber and partially compressing the or each formation on the baffle plate against the adjacent wall of the housing, to provide approximate adjustment of the gap between the valve member and valve seat as gauged against a surface of the housing, and accurately adjusting the gap by means of the adjusting screw means, after the final assembly of the valve.

BRIEF DESCRIPTION OF THE DRAWINGS

An embodiment of the invention is now described, by way of example only, with reference to the accompanying drawing which shows a sectional elevation of an inertia valve formed in accordance with the present invention.

DESCRIPTION OF A PREFERRED EMBODIMENT

Figure 1:
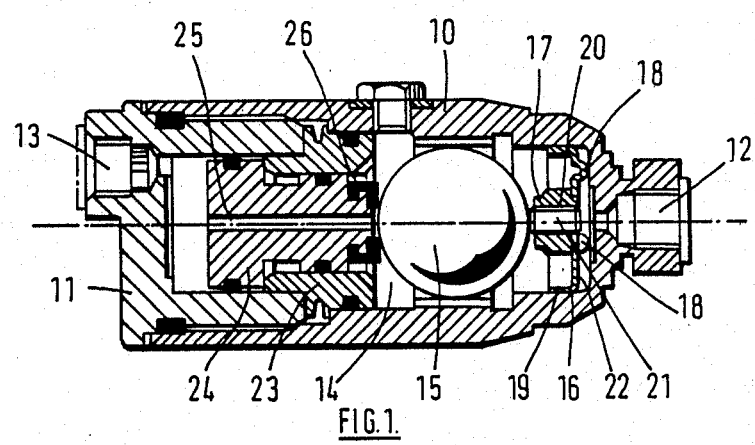

The inertia valve illustrated in the accompanying drawing is an apportioning valve for use in a motor vehicle braking system to control the balance of braking between front and rear brakes, in response to the deceleration of the vehicle. The valve comprises a two-part housing 10, 11 with screw-threaded inter-connection. The housing 10,11 defined a cylindrical bore 14 with inlet 12 at one end and outlet 13 at the other. A ball 15 is located in the cylindrical bore 14 adjacent the inlet 12, said ball 15 being a clearance fit within the cylindrical bore 14 so as to permit fluid entering the housing through inlet 12 to pass to the outlet 13 A baffle plate 16 having a central boss 17 is an interference bit within the cylindrical bore 14 adjacent the inlet 12. The baffle plate 16 has three collapsible dimples 18 which abut the adjacent end wall of the housing 10. A self locking adjusting screw 21, having for example a nylon locking ring, engages in a screw-threaded bore 20 in boss 17, and emerges from the end of the bore 20 adjacent ball 15 to form an abutment for ball 15. The baffle plate 16 is provided with an axially extending flange 19 around its periphery which engages the cylindrical wall of the bore 14, and a hole 22 is provided through the baffle plate 16 so that fluid may flow from inlet 12 past the baffle plate 16 into the cylindrical bore 14.

A sleeve portion 23 is positioned within the cylindrical bore 14 on the outlet side of the ball 15. A piston 24 is slidingly located within the sleeve 23, said piston having a larger diameter end adjacent the outlet 13. The piston is provided with an axial bore 25 and a valve seat 26 surrounds the axial bore at the end adjacent to ball 15. A small clearance is provided between the ball 15 and the valve seat 26 when the ball 15 abuts the adjusting screw 21 on baffle plate 16 and the piston 24 is at its limit of movement towards the inlet 12.

In operation the inertia valve is installed with its axis inclined to the horizontal, inlet 12 being lowermost. In this position, under the influence of gravity, the ball 15 will abut the adjusting screw 21 on baffle plate 16. Fluid entering the inlet 12 will consequently be able to pass the ball 15 and through bore 25 in piston 24 to reach outlet 13. In view of the differential areas of the ends of piston 24 the pressure of fluid in the cylindrical bore 14 will force the piston 24 to the limit of its movement towards inlet 12.

When a braking force is applied the inertial load will force ball 15 up the cylindrical bore 14 towards the valve seat 26, against the force of gravity. Once a predetermined inertial load has been reached the ball 15 will engage valve seat 26 thus cutting off the bore 25 and preventing further flow of fluid from inlet to outlet. The pressure exerted at the outlet 13 which is connected to the rear brakes, will thus be maintained constant until further pressure applied to the inlet overcomes the area differential of piston 24, when the ball 15 and piston 24 will be forced towards outlet 13, thus increasing the load applied to the fluid at outlet 13 and to the rear brakes. This continues until the ball 15 engages the end of sleeve 23 when the seal against valve seat 26 will be broken and fluid will again be permitted to pass straight through from inlet 12 to outlet 13.

In order that the valve described above will operate under the required inertial load, the gap between the ball 15 and seat 26 must be controlled accurately. During assembly of the valve, the baffle plate 16 will be pressed into the end of the cylindrical bore 14 adjacent the inlet 12, the dimples 18 being partially compressed against the adjacent end wall of the housing to provide approximate adjustment of the gap, when gauged, for example, against one of the shoulders of portion 10 of the housing. Final adjustment of the gap may be achieved after completion of the assembly, by means of adjusting screw 21, access to which may be achieved through inlet 12.

I claim:

1. A method of assembly of an inertia valve having a housing an inner side wall and an inner end wall of which define a cylindrical chamber, the cylindrical chamber having an inlet at one end and an outlet at the other, a valve seat being disposed between the inlet and the outlet and a valve member disposed between the inlet and the valve seat, an adjustable baffle plate being provided at the inlet end of the chamber, said baffle plate having a peripheral flange which extends axially to one side of the baffle plate, the baffle plate being locally deformed to provide at least one collapsible formation which extends to the other side of the baffle plate and screw adjustment means, said method comprising:

pressing the baffle plate into one end of the cylindrical chamber so that the flange engages the inner side wall and the collapsible formation engages the inner end wall, partially compressing the collapsible formation against the inner end wall, to provide approximate location of the valve member within the cylindrical chamber, as gauged against a surface of the housing;

assembling the valve member and valve seat within the cylindrical chamber and closing the cylindrical chamber; and adjusting the screw adjusting means to accurately set a desired gap between the valve member and valve seat.

* * * * *